(12) United States Patent
Ahn et al.

(10) Patent No.: US 9,037,526 B2
(45) Date of Patent: May 19, 2015

(54) APPARATUS AND METHOD FOR SELECTING MOTION SIGNIFYING ARTIFICIAL FEELING

(71) Applicant: KOREA INSTITUTE OF INDUSTRIAL TECHNOLOGY, Cheonan (KR)

(72) Inventors: Ho Seok Ahn, Incheon (KR); Dong Wook Lee, Incheon (KR); Woong Hee Shon, Seongnam (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 201 days.

(21) Appl. No.: 13/714,228

(22) Filed: Dec. 13, 2012

(65) Prior Publication Data

US 2014/0172771 A1 Jun. 19, 2014

(51) Int. Cl.
*G06N 5/00* (2006.01)
*G06F 1/00* (2006.01)
*G06N 3/00* (2006.01)

(52) U.S. Cl.
CPC ............... *G06N 3/008* (2013.01); *G06N 3/006* (2013.01)

(58) Field of Classification Search
CPC ......... G06N 5/048; G06N 7/005; G06N 5/02; G06N 5/04
See application file for complete search history.

(56) References Cited

U.S. PATENT DOCUMENTS

| | | | | |
|---|---|---|---|---|
| 2002/0192625 | A1* | 12/2002 | Mizokawa | 434/236 |
| 2003/0060930 | A1* | 3/2003 | Fujita et al. | 700/245 |
| 2011/0251495 | A1* | 10/2011 | Province et al. | 600/483 |

* cited by examiner

*Primary Examiner* — Jeffrey A Gaffin
*Assistant Examiner* — Kalpana Bharadwaj
(74) *Attorney, Agent, or Firm* — Novick, Kim & Lee, PLLC; Jae Youn Kim (57) ABSTRACT

An apparatus for selecting a motion signifying artificial feeling is provided. The apparatus includes: an feeling expression setting unit configured to set probabilities of each feeling expression behavior performed for each expression element of a robot for each predetermined feeling; a behavior combination generation unit configured to generate at least one behavior combination combined by randomly extracting the feeling expression behaviors in each expression element one by one; and a behavior combination selection unit configured to calculate an average for the probabilities of the feeling expression behaviors included in each behavior combination for each feeling of a robot and select behavior combinations in which the average of the probabilities of the feeling expression behaviors most approximates the predetermined feeling value of a robot from each behavior combination.

8 Claims, 6 Drawing Sheets

| Expression-Part ($p$) | Unit Behavior | | Priority | | | |
|---|---|---|---|---|---|---|
| | Name | Index ($w'_p$) | Happiness ($j$=1) | Sadness ($j$=2) | Surprise ($j$=3) | Anger ($j$=4) |
| Mouth ($p$=1) | Neutral | ($w_1$=1) | × | × | × | × |
| | Smile | ($w_1$=2) | 1 | × | × | × |
| | Open | ($w_1$=3) | 2 | × | 1 | 3 |
| | Close | ($w_1$=4) | × | 1 | × | 2 |
| | Shake | ($w_1$=5) | × | 2 | 3 | 1 |
| | Frown | ($w_1$=6) | × | 2 | × | 1 |
| Eyes ($p$=2) | Neutral | ($w_2$=1) | × | × | × | × |
| | Close Both | ($w_2$=2) | 3 | 1 | × | 2 |
| | Close Left | ($w_2$=3) | 1 | × | × | × |
| | Open Both | ($w_2$=4) | 2 | × | 1 | × |
| | Big | ($w_2$=5) | 2 | × | 1 | × |
| | Frown | ($w_2$=6) | × | 2 | × | 1 |
| Head ($p$=3) | Neutral | ($w_3$=1) | × | × | × | × |
| | Nod | ($w_3$=2) | 1 | × | × | × |
| | Swing | ($w_3$=3) | × | 1 | × | 2 |
| | Tilt | ($w_3$=4) | × | 2 | × | 1 |
| | Back | ($w_3$=5) | × | × | 1 | 2 |
| | Down | ($w_3$=6) | × | 1 | × | × |

FIG. 6

| Expression -Part (p) | Unit Behavior | | Probability | | | |
|---|---|---|---|---|---|---|
| | Name | Index ($w_p$) | Happiness (j=1) | Sadness (j=2) | Surprise (j=3) | Anger (j=4) |
| Mouth (p=1) | Neutral | ($w_1$=1) | 0 | 0 | 0 | 0 |
| | Smile | ($w_1$=2) | 1 | 0 | 0 | 0 |
| | Open | ($w_1$=3) | 1/3 | 0 | 1/2 | 1/6 |
| | Close | ($w_1$=4) | 0 | 2/3 | 0 | 1/3 |
| | Shake | ($w_1$=5) | 0 | 1/3 | 1/6 | 1/2 |
| | Frown | ($w_1$=6) | 0 | 1/3 | 0 | 2/3 |
| Eyes (p=2) | Neutral | ($w_2$=1) | 0 | 0 | 0 | 0 |
| | Close Both | ($w_2$=2) | 1/6 | 1/2 | 0 | 1/3 |
| | Close Left | ($w_2$=3) | 1 | 0 | 0 | 0 |
| | Open Both | ($w_2$=4) | 1/3 | 0 | 2/3 | 0 |
| | Big | ($w_2$=5) | 1/3 | 0 | 2/3 | 0 |
| | Frown | ($w_2$=6) | 0 | 1/3 | 0 | 2/3 |
| Head (p=3) | Neutral | ($w_3$=1) | 0 | 0 | 0 | 0 |
| | Nod | ($w_3$=2) | 1 | 0 | 0 | 0 |
| | Swing | ($w_3$=3) | 0 | 2/3 | 0 | 1/3 |
| | Tilt | ($w_3$=4) | 0 | 1/3 | 0 | 2/3 |
| | Back | ($w_3$=5) | 0 | 0 | 2/3 | 1/3 |
| | Down | ($w_3$=6) | 0 | 1 | 0 | 0 |

APPARATUS AND METHOD FOR SELECTING MOTION SIGNIFYING ARTIFICIAL FEELING

BACKGROUND OF THE INVENTION

1. Field of the Invention

Exemplary embodiments of the present invention relate to an apparatus and a method for selecting a motion signifying artificial feeling, and more particularly, to an apparatus and a method for selecting a motion signifying artificial feeling capable of selecting in real time optimal behavior combinations that can be expressed by a robot so as to be similar to human's feeling expressions as maximally as possible.

2. Description of Related Art

Even though the human's feeling is the same, human does not show the same feeling expressions (behaviors) at all times but shows slightly different feeling expressions (behaviors). Further, human shows behaviors reflecting various feelings, rather than one feeling. The behaviors may be changed according to a size feeling an feeling.

However, the existing researches into feeling expressions of a robot map one behavior to one feeling one-to-one and then, express behaviors corresponding to the decided feelings. This is a method that can show a simple behavior but cannot show various behaviors. Further, a previous definition process is required to show various behaviors. However, the process is a process that is to be manually performed by someone, which is an inefficient method. Therefore, there is a need to devise a method for generating behaviors reflecting various feelings only by several definitions.

SUMMARY OF THE INVENTION

An embodiment of the present invention is directed to an apparatus and a method for selecting a motion signifying artificial feeling capable of selecting in real time optimal behavior combinations that can be expressed by a robot so as to be similar to human's feeling expressions as maximally possible.

Objects of the embodiment of the present invention are not limited the above-mentioned objects and other objects may be apparently understood to a person skilled in the art to which the present invention pertains from the following description.

An apparatus for selecting a motion signifying artificial feeling, includes: an feeling expression setting unit configured to set probabilities of each feeling expression behavior performed for each expression element of a machine for each predetermined feeling; a behavior combination generation unit configured to generate at least one behavior combination combined by randomly extracting the feeling expression behaviors in each expression element one by one; and a behavior combination selection unit configured to calculate an average for the probabilities of the feeling expression behaviors included in each behavior combination for each feeling of a machine and select behavior combinations of which the average most approximates the predetermined feeling value of the machine from each behavior combination.

When the average most approximating the feeling value of the machine is an approximation average, the behavior combination selection unit may calculate the average in an order of the behavior combinations input from the behavior combination generation unit and calculates the average in an order of the behavior combinations input from the behavior combination generation unit when a difference between the currently calculated average and the approximation average satisfies the randomness in the case in which the currently calculated average is not the approximation average up to now, selects the currently calculated average as the approximation average up to now.

A method for selecting a motion signifying artificial feeling, includes: setting probabilities of each feeling expression behavior performed for each expression element of a machine for each predetermined feeling; generating at least one behavior combination by randomly extracting the feeling expression behaviors from each expression element one by one; and calculating an average for the probabilities of the feeling expression behaviors included in each behavior combination for each feeling of a machine and selecting behavior combinations of which the average most approximates the predetermined feeling value of the machine from the behavior combinations.

A behavior combination b(k) selected as one most approximating the feeling value of the machine may be determined according to the following Equation 2.

$$b(k) = \arg\min_{[w_1 w_2 \ldots w_p w_P]^T} \left\| e(k) - \frac{1}{P}\sum_{p=1}^{P} \overline{e}_{p,w_p} \right\| \qquad [\text{Equation 2}]$$

In the above Equation 2, the e(k) is an feeling value (vector) of the machine that is to be expressed at k time, P is a total number of feeling expression elements of the machine, $\overline{e}_{p,w_p}$ is an feeling value (vector) of a $w_p$-th feeling expression behavior in a p-th expression element, $\|\ \|$ is a size of a vector (inter-vector distance), min is an operator that selects a minimum value from a plurality of values, and $\arg_{[w_1 w_2 \ldots w_p \ldots w_P]^T}$ is an operator that indicates factors $w_1, w_2, \ldots, w_p, \ldots, w_P$ used to derive values as a transposed matrix, and b (k) is a behavior combination selected as one more approximating the feeling value of the machine.

A method for selecting a motion signifying artificial feeling, includes: a) setting probabilities of each feeling expression behavior performed for each expression element of a machine for each predetermined feeling; b) generating an initial behavior combination by extracting the feeling expression behaviors most approximating predetermined feeling values of the machine for each expression element; c) generating behavior combinations by randomly extracting the feeling expression behaviors from each expression element one by one and calculating the average of probabilities of the feeling expression behaviors included in the behavior combinations for each feeling of the machine; d) determining which of the average of the probabilities and the optimal behavior combinations using the initial behavior combination as an initial value more approximates the feeling values of the machine, and e) when the average of the probabilities more approximates the feeling values of the machine, substituting the behavior combinations of the average of the probabilities into the optimal behavior combinations and when a repeated value is subtracted and then, the repeated value is a setting value or more, selecting the optimal behavior combinations as the behaviors of the machine and otherwise, returning to the step c).

The method for selecting a motion signifying artificial feeling may further include: f) determining whether a difference between the behavior combinations of the average of the probabilities and the optimal behavior combinations satisfies randomness; g) when the randomness is satisfied, substituting the optimal behavior combinations into the behavior combinations and when the repeated value is subtracted and then, the repeated value is a setting value or less, selecting the optimal behavior combinations as the behaviors of the machine and otherwise, returning to the step c) and h) when the randomness is not satisfied, returning to the step c).

In the step f), when the optimal behavior combinations more approximate the feeling values of the machine, it may be determined whether the difference between the behavior combinations of the average of the probabilities and the optimal behavior combinations satisfies the randomness.

It may be determined whether the randomness is satisfied according to the following Equation 3.

$$P_A(k) > \text{random}(0, 1) \quad \text{[Equation 3]}$$

In the above Equation 3, $$P_A(k) = e^{\frac{1}{Z}(\text{error}(b_{est}(k)) - \text{error}(b_{can}(k)))},$$

random (0, 1) is a random value between 0 and 1, Z is a value reduced whenever a repeated value is counted as an ending constant, error ($b_{best}(k)$) is a size of the difference between the optimal behavior combinations and the feeling values of the machine, and error ($b_{can}(k)$) is as size of the difference between the behavior combinations and the feeling values of the machine $$\text{error}(b_{can}(k)) = \left\| e(k) - \frac{1}{P}\sum_{p=1}^{P} \bar{e}_p, w_p \right\|.$$

DESCRIPTION OF SPECIFIC EMBODIMENTS

Hereinafter, an apparatus and a method for selecting feeling expression behaviors in accordance with embodiments of the present invention will be described in more detail with reference to the accompanying drawings.

Prior to full description, an feeling expression method of a machine will be described so as to help understanding.

Figure 1:
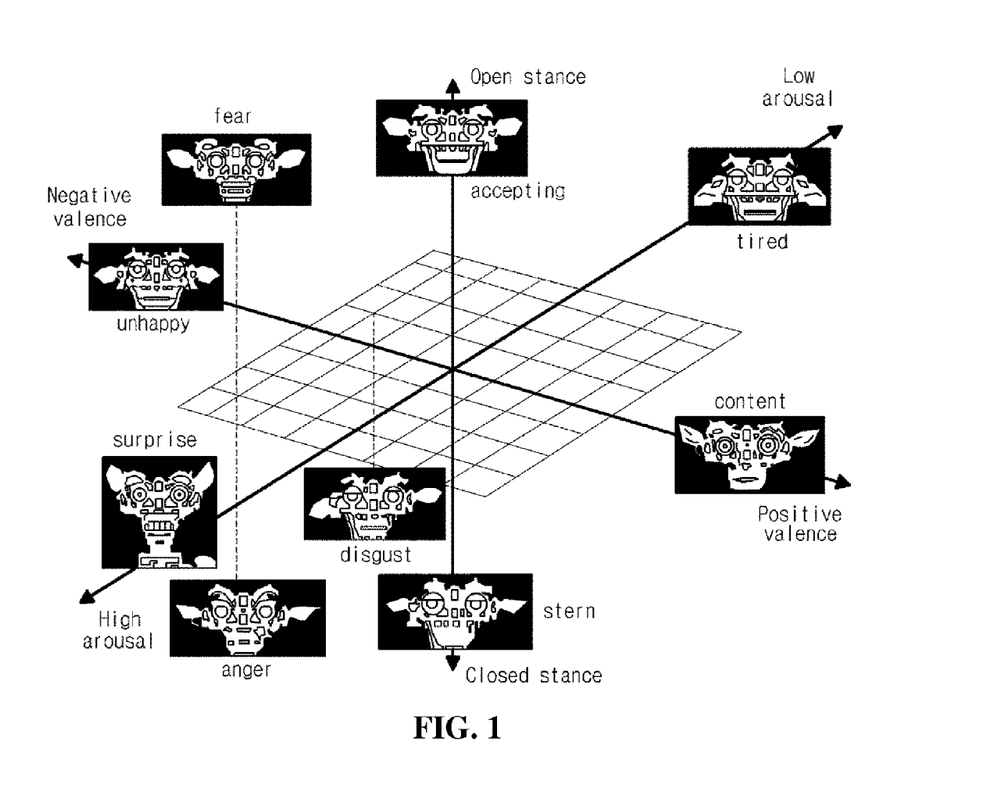
FIG. 1 is a schematic diagram illustrating a general feeling expression method of a machine.

FIG. 1 is a schematic diagram illustrating a general feeling expression method of a robot.

In order for a robot to express an feeling, a current feeling value of a robot needs to be calculated. The case in which an feeling is decided as one detailed feeling such as happiness, sadness, and the like, is infrequent. Even when a man currently feels happiness, other feelings, such as feeling of fright, feeling of surprise, and the like, are partially reflected. That is, feeling expressions are results obtained by reflecting composite detailed feelings. Therefore, in order to implement realistic feeling expressions by a robot, feeling values that are applied to a robot may be represented by a vector, while reflecting various detailed feelings such as happiness, sadness, surprise, anger, and the like.

As illustrated in FIG. 1, a fixed dimensional space of two-dimension or three-dimension is generally used so as to express an feeling of a robot and the feeling and the feeling expression corresponding to the feeling are mapped to predetermined locations on the fixed dimensional space. The feeling values can be represented and calculated by a vector value corresponding to the predetermined locations on the space.

That is, after the feelings are mapped to several points on the vector space and the feeling expressions corresponding to each feeling are mapped thereto one-to-one, when the specific feeling vector is given, a method for selecting one of the most approximation feelings from the specific feeling vector and several feelings mapped on the vector space and implementing the feeling expressions mapped to the selected feelings one-to-one has been used.

In other words, since there is a limitation in manually mapping feelings and feeling expressions corresponding to the feelings to infinite coordinates on the vector space, the method in accordance with the related art illustrated in FIG. 1 selects few coordinates, maps feelings corresponding to each coordinate, feeling expression behaviors corresponding to the feelings, and analyzes the feeling values of a robot to select the feelings of the nearest coordinates, thereby performing the feeling expressions.

For example, feeling values 1 {happiness 1, sadness 0, surprise 0, anger 0} are set to coordinate 1 on a four-dimensional vector space and when feeling values 2 {happiness ¾, sadness ¼, surprise 0, anger 0} and feeling values {happiness ¾, sadness 0, surprise ¼, anger 0} are closer to coordinate 1 than a coordinate expressing other feelings, all of the feeling values 1, 2, and 3 perform feeling expressions set to coordinate 1.

As such, according to the method of the related art, even though the actually generated feeling values are different internally, the selected feeling values selects only the most similar one of the feeling values mapped to the coordinate 1 and since the feeling expression behaviors are selected based on the feeling values on the same coordinates, a type expressed by an expression organ is generally the same.

That is, when a surprise is partially reflected even in happiness, it may be natural to open a mouth wide, In accordance with the method of FIG. 1, this is similarly expressed merely to a behavior in happiness and therefore, this feeling expression behavior is not obviously a natural behavior.

Hereinafter, in order to overcome a limitation of the related art, embodiments of the present invention will be reviewed.

First, the overall configuration of an artificial feeling learning apparatus that can adopt an apparatus and a method for selecting feeling expression behaviors of a robot in accordance with an embodiment of the present invention will be described with reference to FIGS. 2 and 3 and then, an apparatus and a method for selecting feeling expression behaviors in accordance with an embodiment of the present invention will be described.

Figure 2:
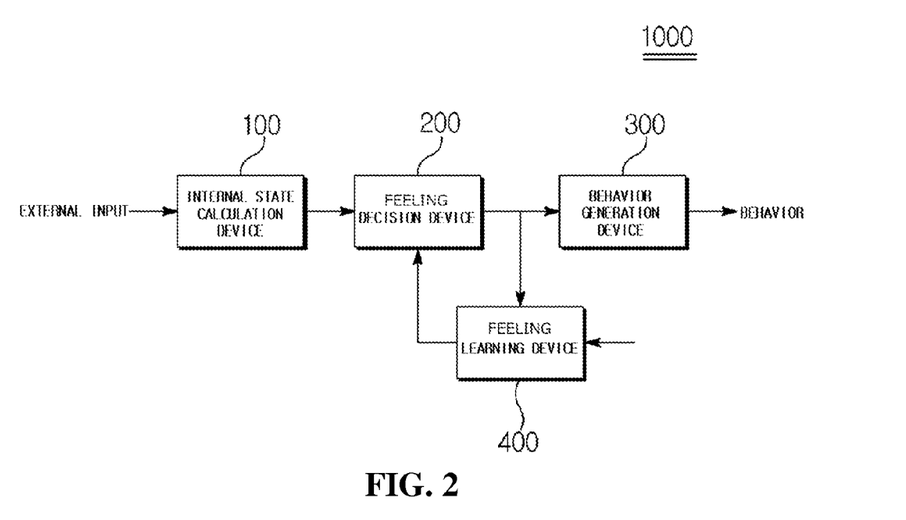
FIG. 2 is a schematic block diagram of an artificial feeling learning apparatus to which an apparatus for selecting feeling expression behaviors of a machine in accordance with an embodiment of the present invention can be applied.

FIG. 2 is a schematic block diagram of an artificial feeling learning apparatus to which an apparatus for selecting feeling expression behaviors of a robot in accordance with an embodiment of the present invention can be applied. FIG. 3 is a schematic configuration diagram for describing an operation principle of the artificial feeling learning apparatus of FIG. 2.

Figure 3:
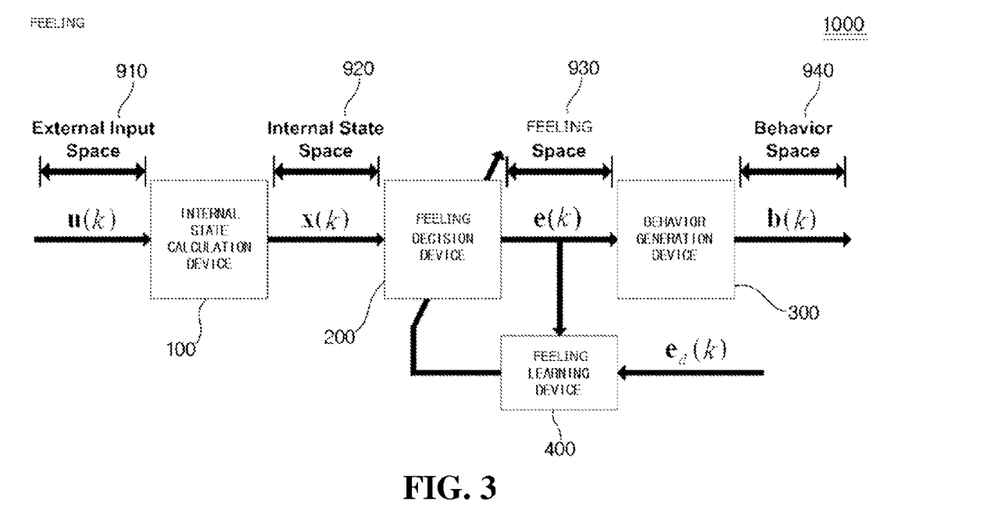
FIG. 3 is a schematic block diagram for describing an operation principle of the artificial feeling learning apparatus of FIG. 2.

FIGS. 2 and 3 illustrate the artificial feeling learning apparatus using a generative probability model to which the present invention can be applied.

In order to learn generative probability model based artificial feeling, an artificial feeling learning apparatus 1000 in accordance with an embodiment of the present invention is configured to include an internal state calculation device 100 that is an external input space 910, an internal state space 920, an feeling space 930, and behavior space 940 that are four spaces and performs a mapping process, and the like, an feeling decision device 200, and a behavior generation device 300, and an feeling learning device 400.

First, an external input space 910 is configured of a vector space using information that is sensed from an outside, such as a face expression, a gesture, a tone, and the like.

Second, the internal state space 920 is configured of a five-factor model of personality, wherein the five-factor model of personality is configured of openness to experience, conscientiousness, extraversion, agreeableness, and neuroticism.

Further, the internal state space may indicate a state that is configured of only at least one of five factors according to definition. A distribution of feeling that may be generated according to characteristics of personality is generated at a predetermined location of an axis of a space signifying each factor and a probability distribution value of feeling may be decided according to values represented by the internal state vector.

The internal state space is a concept that is introduced to configure a basic internal state for a robot having personality or feeling to be proposed by the present invention to react to specific external input. In detail, even though the same external input or stimulation is applied, each human has a different degree of reaction, that is, different feelings according to growth background or environment and ultimately expresses his/her own feeling based on the different feelings.

For example, when the same external stimulation is applied to human that is exposed to violent environment for a long period of time or human that is not exposed to violent environment, there is a high possibility that the former is in the internal state, that is, personality is in a very keen state and there is a high possibility that the former generates feelings based on the state, while there is a high possibility that the latter is not like that.

The feeling space 930 is configured of a vector space based on a size of feeling such as happiness, surprise, sadness, love, fear, disgust, anger, and the like. Each axis of the feeling space indicates each used feeling such as happiness, surprise, and the like, and the number of axes of the feeling space may be decided according to the number of feelings.

The axis of the feeling space is ranging from 0 to 1 and a value of the feeling vector is decided according to the feeling probability distribution that is disposed in the internal state space. In addition, the value of the feeling vector indicates one point on the feeling space, wherein a value of the point may indicate various feeling values.

Generally, a range of the probability is ranging from 0 to 1 and therefore, the foregoing setting is made, but the range of the probability can be expanded or reduced, which may be similarly applied to the range of the axis of the feeling space.

The behavior space 940 is configured of a vector space based on a unit behavior signifying the smallest behavior such as a smiling mouth, a mouth open, and the like, of each feeling expression organs such as a mouth, eyes, a head, and the like. Each axis of the behavior space has one axis for each expression organ and one point one the behavior space may represent the selected optimal behavior combinations.

Next, when describing four devices, the internal state calculation device 100 calculates an internal state based on an internal process and performs mapping to the internal state space 920 from the external input space 910, and defines the internal state space 920 and dimension. The internal state signifies one point within the internal state space 920 that uses external inputs.

In the related art, the existing internal state space is arbitrarily modified despite the basis of psychological researches and the internal state space and the feeling space equate to each other and the feelings are fixed at a predetermined location on the equated space. Therefore, the existing internal state space generates the same feelings even when the internal state vector is changed. However, in order to solve the above problems, the embodiment of the present invention configures the internal state space 920 based on the five-factor model of personality that is the psychological researches. The five-factor model of personality is introduced for psychologically describing personality, which is widely known in advance and therefore, the detailed description thereof will be omitted herein.

The internal process of the internal state calculation device 100 may be configured using the revised NEO personality inventory (NEO PI-R) that is a measuring method of the five-factor model of personality. The feeling decision device 200 using the NEO PI-R selects the feeling vector mapped to the feeling space 930 in the internal state space 920 based on an feeling decision process.

In the related art, since the internal state space is disposed in a plurality of fixed zones that classify feelings, it is difficult to reflect a difference in ages or cultural background. In addition, there is a problem in that the definition and number of basic feelings are different for each psychological research. However, the embodiment of the present invention sets the feeling vector mapped to the feeling space in the internal state space by the feeling probability method using a Gaussian mixture model (GMM) on the feeling space and renews the feeling probability by a feedback of a user. In accordance with the configuration, it is possible to select the feeling vector selected by the probability value distributed on all the feelings, unlike merely selecting only one feeling as in the related art.

The behavior generation device 300 performs mapping to the behavior space 940 in the feeling space 930 so as to generate a behavior of a robot based on a behavior generation process.

In the related art, the behavior generation device selects the behavior or motion of a robot using the predetermined 1:1 mapping between the behavior and the feeling. Therefore, the existing robot expresses the same behavior at all times when the same external input, and the like, is given. Further, one behavior generated by the existing robot reflects only one feeling, such that the robot can express only the simple and fragmental behavior. However, the embodiment of the present invention introduces a concept of the behavior generation process for generating various behaviors in consideration of the unit behavior and the probability feeling value, so as for a robot to decide a behavior having the highest probability.

Hereinafter, the feeling decision processes based on the generative probability model for the internal state generation will be separately described.

First, as illustrated in FIGS. 2 and 3 in connection with the internal state generation, the feeling system 1000 using the generative probability model includes two processes that are referred to as the internal process and the feeling decision process having a learning scheme.

The internal process maps the external input space 910 to the internal state space 920 and generates the internal state at one point present within the internal state space 920. The internal process may be modeled based on the revised NEO personality inventory (NEO PI-R) that is a method developed to measure the five factor model of personality. The five-factor model of personality, which is a model for describing individual's personality, includes the following five personalities:

openness to experience;
conscientiousness;
extraversion;
agreeableness; and
neuroticism.

Further, the NEO PI-R, which is a kind of psychological personality check scheme, may be used as a method for measuring the five-factor model of personality. The NEO PI-R experiment includes six lower elements (facet) that are known as facets of each factor of the five-factor model of personality and may measure these six sub-elements. The six sub-elements per each factor model of personality are as follows.

Openness to experience includes fantasy, aesthetics, feelings, actions, ideas, and values.

Conscientiousness includes competence, order, dutifulness, achievement striving, self-discipline, and deliberation.

Extraversion includes warmth, gregariousness, assertiveness, activity, excitement seeking, and positive feeling.

Agreeableness includes trust, straightforwardness, altruism, compliance, modesty, and tender mindedness.

Neuroticism: anxiety, hostility, depression, self-consciousness, impulsiveness, and vulnerability to stress.

In the present embodiment, u(k) of FIG. 3 is defined by an external input vector and elements of the external input vector indicate external input states such as face expression, gesture, tone, and the like. In addition, the external input vector is present in the S-dimensional external input space 910 in which S external inputs are present.

x(k) is defined by the internal state vector and the elements of the internal state vector represents a state of five factors such as openness to experience, conscientiousness, extraversion, agreeableness, and neuroticism on the internal state space 920 based on the five-factor model of personality Further, the x(k) may indicate a state that is configured of only at least one of five factors according to definition.

The foregoing u(k) becomes an input of the internal process and the x(k) becomes an output of the internal process. If there is no external input for a predetermined time, the internal state is converged to 0 in which the feeling state is neutral. The u(k) signifies the stimulation input from the outside, that is, all data that can be sensed by a robot, while being the input of the internal process The feeling decision process is a process that is mapped to the feeling space 930 from the internal state space 920 and generates the feeling vector that is one point present on the feeling space 930. The feeling system 1000 in accordance with the present embodiment sets the feeling probability distribution distributed on the internal state space 920 and renews the feeling probability distribution by learning.

e(k) is defined by the feeling vector and elements configuring the feeling vector indicate the probability size of the feeling that is indicated by the corresponding element. The feeling space 930 may be J dimension. Here, the J indicates the number of feelings.

The foregoing x(k) is input to the feeling decision process and the e(k) is output from the feeling decision process. When the x(k) is input to the feeling decision process, each feeling probability may be decided based on the feeling probability distribution that is distributed in the internal state space 920 and the e(k) may be decided to have the probability for all the feelings.

b(k) is defined by a behavior vector and elements configuring the behavior vector set the probability of each feeling expression behavior and include at least one of each combination of the feeling expression behaviors and may be implemented to indicate the feeling expression behaviors based on the combinations of the feeling expression behaviors.

The foregoing e(k) becomes an input of the behavior generation process and the x(k) becomes an output of the behavior generation process. When the e(k) is input to the behavior generation process, the behavior generation process of the behavior generation device 300 may express various feeling behaviors based on the b(k) including a random behavior combination using the feeling probability decided in the feeling space 930.

Figure 4:
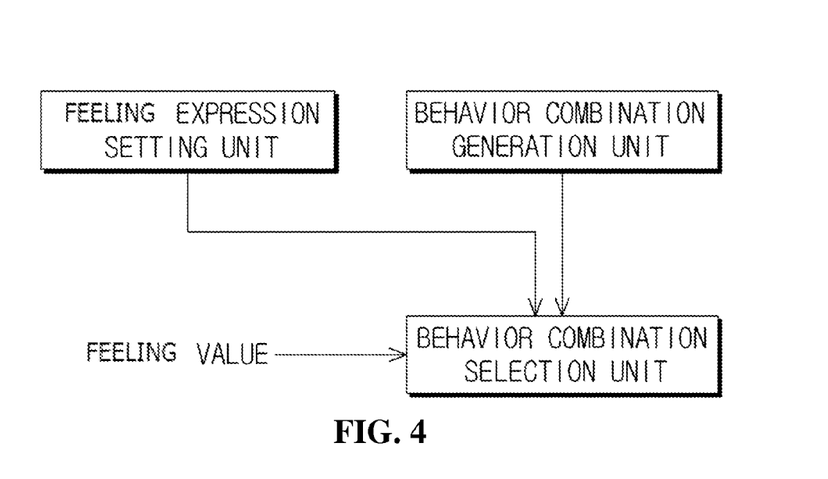
FIG. 4 is a block diagram illustrating an apparatus for selecting feeling expression behaviors in accordance with an embodiment of the present invention.
Figure 5:
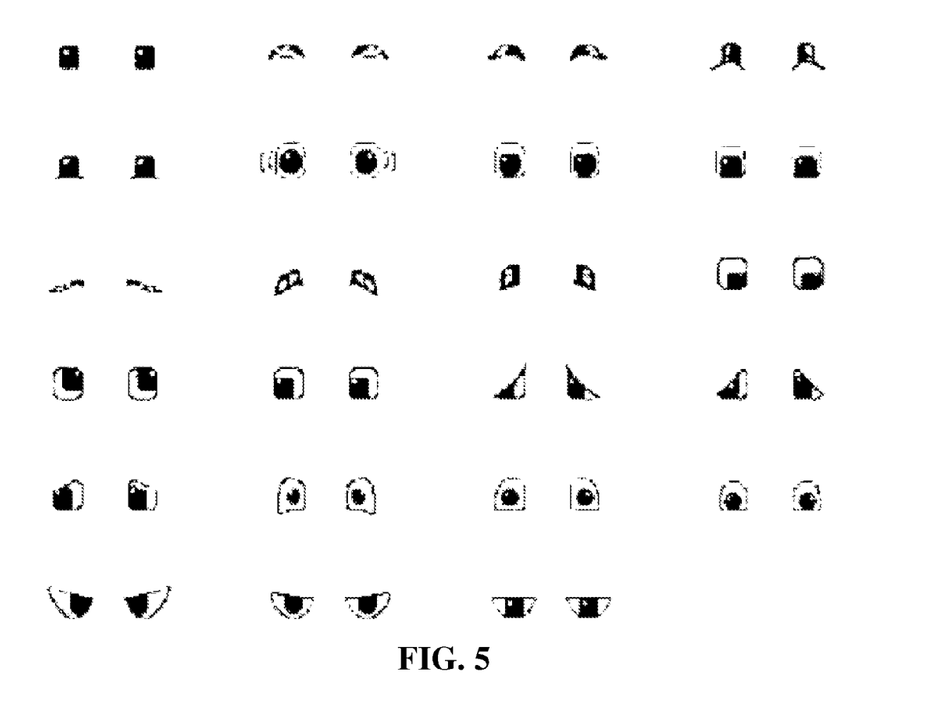
FIG. 5 is a schematic diagram illustrating various behaviors of eyes among elements of a machine that can be adopted in the embodiment of the present invention.
Figure 6:
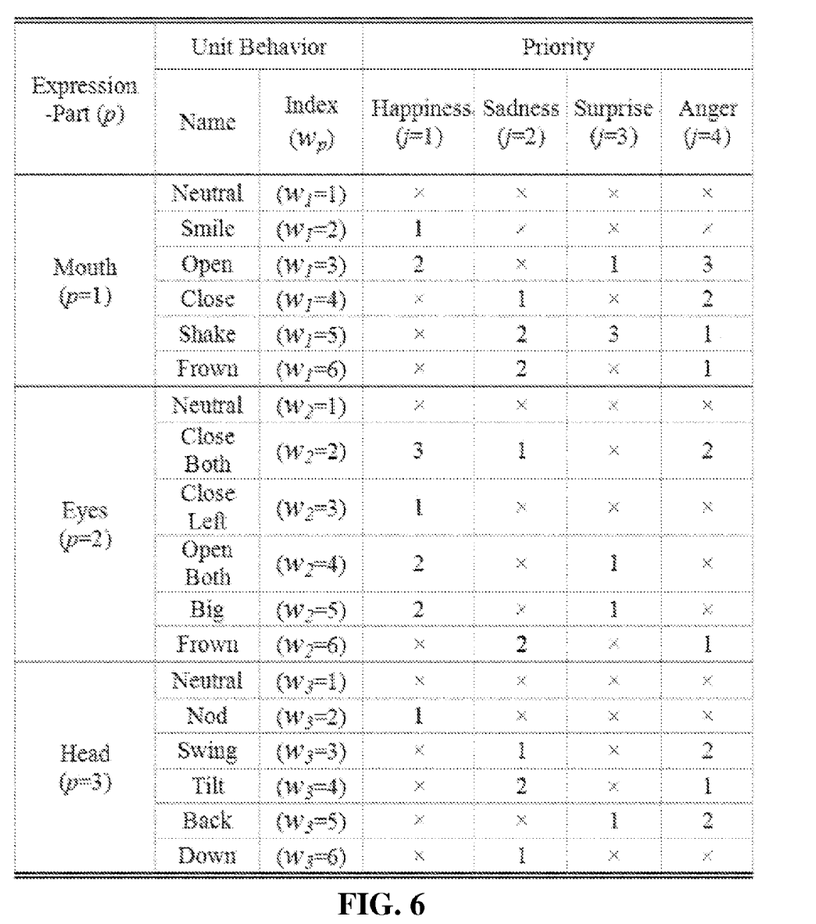
FIG. 6 is a schematic diagram illustrating a table in which priorities for each feeling for the feeling expression behaviors of each element of a machine are set by a user, in accordance with the embodiment of the present invention.
Figure 7:
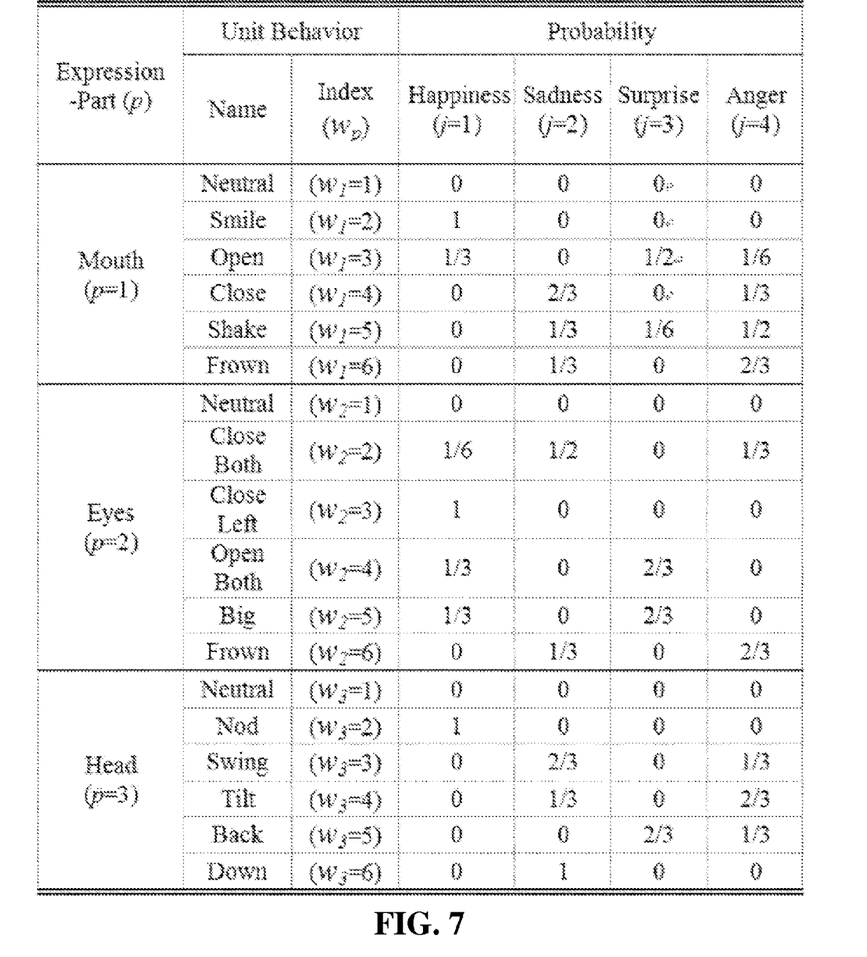
FIG. 7 is a schematic diagram illustrating a table in which probability values for each feeling for the feeling expression behaviors of each element of the machine are set based on the table of FIG. 6.

FIG. 4 is a block diagram illustrating an apparatus for selecting feeling expression behaviors in accordance with an embodiment of the present invention. FIG. 5 is a schematic diagram illustrating various behaviors of eyes among expression elements of a robot that can be adopted in the apparatus for selecting feeling expression behaviors of FIG. 4. FIG. 6 is a schematic diagram illustrating a table in which priorities for each feeling for the feeling expression behaviors of each expression element of a robot are set by a user, in accordance with the embodiment of the present invention. FIG. 7 is a schematic diagram illustrating a table in which probability values for each feeling for the feeling expression behaviors of each expression element of a robot are set based on the table of FIG. 6.

The apparatus for selecting feeling expression behaviors in accordance with the embodiment of the present invention corresponds to a means performing a function of at least a part of the apparatus for deciding feeling as described above or a configuration unit performing a function corresponding to the means, with reference to FIGS. 2 and 3.

As illustrated in FIG. 4, the apparatus for selecting feeling expression behaviors includes an feeling expression setting unit 110 that sets a probability of each feeling expression behavior performed for each expression element of a robot for each predetermined feeling, a behavior combination generation unit 130 that randomly extracts the feeling expression behaviors one by one from each expression element of a robot to generate at least one of the combinations of combined behaviors, and a behavior combination selection unit 150 that calculates an average of the probabilities of the feeling expression behaviors included in each behavior combination for each predetermined feeling of a robot and selects from each behavior combinations the behavior combinations in which the average most approximates the predetermined feeling values of a robot.

In more detail, the feeling expression setting unit 110 defines the behaviors (feeling expression behaviors) associated with the feeling expression in various behaviors of each expression element and sets the probabilities for each feeling for each feeling expression behavior. The feeling expression setting unit 110 is performed at an initialization step of a robot and is not basically operated during the behavior of a robot, but may be operated for initialization when a user changes priorities. The feeling expression setting unit 110 may be implemented by a means for deciding a specification of a robot and performing setting before a user uses a robot or a configuration unit for performing a function corresponding to the means.

The expression elements of a robot are individual behavior elements or feeling expression elements that can be operated by a robot capable of visually or audibly recognizing the behavior of a robot from the outside. For example, eyes, mouth, ears, head, hand, foot, and the like, correspond to the expression elements of a robot. The expression elements of a robot may also include a speaker displaying feeling sound such as laughing, crying, and the like.

That is, a robot includes a predetermined expression portion as the individual behavior elements or the feeling expression elements and the expression portion may be differently included or set according to the specification of a robot. For example, a face robot may use only the portions in a face such as eyes, nose, mouth, and the like, for behavior or feeling expression and a robot having an arm and a leg may use arm and leg portions for feeling expression. In addition, among the face robot, the feeling may be expressed using only eyes and mouth or the feeling may be expressed separately using eyebrows, eyes, or ears, according to the specification or the setting.

For example, the feeling expression setting unit 110 may select all or a part of a total of 23 behaviors of eyes illustrated in FIG. 5 as the feeling expression behaviors. Describing in more detail, a user defines all the behaviors that may be expressed for each expression portion for eyes as illustrated in FIG. 5. For example, a detailed behavior such as an eye open by 1°, 2°, and the like, may be set. In addition, the relationship between each detailed behavior and the feelings may be set as priorities as illustrated in FIG. 6.

In addition, the feeling expression setting unit 110 sets the probabilities for each feeling (detailed behavior) as illustrated in FIG. 7 in connection with the feeling expression behaviors. The probability table illustrated in FIG. 7 is a table indicating how much each detailed behavior is associated with the feelings and may be used as a reference data when the optimal behavior combinations are determined later. As illustrated in FIG. 7, the feeling expression behaviors of neutral, smile, open, close, shake, frown are defined for a mouth and six expression behaviors are each defined for eyes and head. Further, the number of feeling expression behaviors of each expression element may not be the same.

For example, the feeling expression setting unit 110 may set the probabilities for each detailed feeling for open as illustrated in FIG. 7. In detail, happiness may be set to be $2/6=1/3$, sadness may be set to be 0, surprise may be set to $3/6=1/2$, and anger may set to be $1/6$. The probabilities are set for all the behaviors for each expression element. The number and probability of feelings (detailed feelings) may be set by a user. When a user directly sets the probabilities, the feeling expression setting unit 110 may perform a function of a database in which the probabilities for each feeling for the feeling expression behaviors of each expression element are stored in a table.

Meanwhile, it may be difficult for a user to directly set the probabilities and as a result, a user simply sets only priorities and the priorities set by the feeling expression setting unit 110 may be transformed into the probabilities.

In addition, the feeling expression setting unit 110 may use the following Equation 1 so as to transform the priorities of FIG. 6 into the probabilities of FIG. 7.

$$\overline{e}_{p,w_p,j}=0 \quad \text{[Equation 1]}$$

is used when feelings are not associated with behaviors of expression elements, but $$\overline{e}_{p,w_p,j}=\frac{(r_{p,w_p,max}-r_{p,w_p,j}+1)}{r_{p,w_p,sum}}$$

is used when feelings are associated with behaviors of expression elements.

In the above Equation 1, $\overline{e}_{p,w_p,j}$ is a probability value of j-th feeling for a $w_p$-th feeling expression behavior in a p-th expression element, $r_{p,w_p,j}$ is a priority of j-th feeling for a $w_p$-th feeling expression behavior in a p-th expression element, $r_{p,w_p,max}$ is the largest value of priorities of j-th feeling for a $w_p$-th feeling expression behavior in a p-th expression element, $r_{p,w_p,sum}$ is a sum of priorities of all the feelings for a $w_p$-th feeling expression behavior in a p-th expression element.

In FIG. 7, the priority of the mouth open is that surprise is selected as a top rank, happiness is selected as second rank, and anger is selected as third rank. When this is applied to Equation 1, the mouth open happiness becomes $(3-2+1)/6=1/3$. The mouth open sadness is 0 due to the absence of priority. The mount open surprise becomes $(3-1+1)/6=1/2$. The mount open anger becomes $(3-3+1)/6=1/6$. This coincides with the case of FIG. 6.

The behavior combination generation unit 130 randomly extracts and combines the feeling expression behaviors in each expression element one by one to generate the behavior combinations. The behavior combination is a set of the feeling expression behaviors of each expression element operated at the time of expressing the feelings. For example, the behavior combinations may be made by extracting the open behavior from the mouth that is the expression element, the big behavior from eyes that is the expression element, and the back behavior from a head that is the expression element. The probabilities (value) of the combinations are listed as follows in an order of happiness, sadness, surprise, and anger.

| Mouth | 1/3 0 | 1/2 1/6 |
| Eyes | 1/3 0 | 2/3 0 |
| Head | 0 0 | 2/3 1/3 |

The behavior combination generation unit 130 may generate at least one behavior combination.

Randomly extracting the feeling expression behavior is to perform various feeling expression behaviors for the same feeling values, which will be described below.

Next, the behavior combination selection unit 150 first obtains an average for each feeling for the probabilities of the feeling expression behaviors included in the behavior combinations.

That is, in the case of the combinations of the mouth open-eye big-head back behaviors, the average of the happiness is set to be $(1/3+1/3+0)/3=2/9$, the average of sadness is set to be 0, the average of surprise is set to be $(1/2+2/3+2/3)/3=11/18$, and the average of anger is set to be $(1/6+0+1/3)/3=1/6$.

Next, the calculated average value is compares with the input feeling value of a robot. When the feeling values of a robot are a vector of a {happiness, sadness, surprise, anger} type, the average values calculated so as to be compared with each other are vectorized like {2/9, 0, 11/18, 1/6} (hereinafter, referred to as a first vector).

Next, the behavior combination selection unit 150 calculates a distance between the calculated vector average values and the currently input feeling values of a robot. When there are the plurality of behavior combinations, the distance to the feeling values of a robot is obtained based on the average values for each feeling for each behavior combination as described above and the behavior combinations in which the average (vector) having the smallest distance is selected. The selected behavior combinations are transmitted to the control unit that controls each element, such that the robot may express the natural feeling. Making the distance between two vectors smallest represent the nearest.

For example, the behavior combinations may be made by extracting a smile behavior from the mouth that is the expression element, a big close both behavior from eyes that is the expression element, and a tilt behavior from a head that is the expression element. The probabilities (value) of the combinations are listed as follows in an order of happiness, sadness, surprise, and anger.

| Mouth | 1      | 0 | 0   | 0 |
| Eyes  | 1/6 1/20 |   | 1/3 |   |
| Head  | 0 1/30 |   | 2/3 |   |

Similarly to the foregoing example, obtaining the averages for each feeling for the probabilities of the feeling expression behaviors is vectorized like {7/18, 5/18, 0, 1/3} (hereinafter, referred to as a second vector). When the currently input feeling vector values of a robot are set to be {2/8, 1/8, 5/8, 0} (referred to as a third vecto), a first vector that is a vector in a short distance is selected by comparing a distance $$\left(\sqrt{\frac{230}{5184}}\right)$$

between the third vector and the first vector and a distance $$\left(\sqrt{\frac{2822}{5184}}\right)$$

between the third vector and the second vector and the open behavior in a mouth, the big behavior in eyes, and the back behavior in a head that are the behavior combinations associated with the selected first vector are expressed.

The present example describes a behavior between two behavior combinations and the current feeling values, but the possible combination number of behaviors is $5^3$ and the most approximating behavior combination of $5^3$ behavior combinations may be selected and expressed.

The behavior of the behavior combination selection unit 150 may be defined by the following Equation 2. The following Equation recalls one example of describing the behavior of the behavior combination selection unit 150.

$$b(k) = \arg\min_{[w_1 w_2 \ldots w_p w_p]^T} \left\| e(k) - \frac{1}{P}\sum_{p=1}^{P} \bar{e}_{p,w_p} \right\| \qquad \text{[Equation 2]}$$

In the above Equation 2, e(k) is an feeling value (vector) of a robot that is to be expressed at k time, P is a total number of feeling expression elements of a robot, $\bar{e}_{p,w_p}$ is an feeling value (vector) of a $w_p$-th feeling expression behavior in a p-th expression element, $\| \|$ is a size of a vector (inter-vector distance), min is an operator that selects a minimum value from a plurality of values, $\arg_{[w_1 w_2 \ldots w_p \ldots w_P]^T}$ is an operator that indicates factors $w_1$, $w_2, \ldots, w_p, \ldots, w_P$ used to derive values as a transposed matrix, and b(k) is a behavior combination selected as one most approximating the feeling values of a robot.

According to the existing feeling expression scheme, a robot may express the feelings based on only few combinations that are previously defined, but in accordance with the above configuration, may express the feelings based on several behavior combinations that are the expression elements at the time of using all the extractable behavior combinations (the number of branches of the feeling expression behaviors allocated to the expression elements).

Further, when the behavior combination generation unit 130 randomly extracting the feeling expression behaviors generates only a part of the behavior combinations rather than all the behavior combinations, other behavior combinations for the same feeling values may be selected. Therefore, more natural feeling expression can be performed. For example, in the case of human, when the happiness feeling is expressed, a mouth may be tilted instead of smile and in accordance with the above configuration, the randomness of the so-called feeling expression may be implemented.

In order to exhibit the randomness of the feeling expression, the next scheme may be additionally considered.

When the average most approximating the feeling value of a robot is an approximation average, the behavior combination selection unit 150 calculates the averages in an order of the behavior combinations input from the behavior combination generation unit 130 and when a difference between the currently calculated average and the approximation average satisfies the randomness in the case in which the currently calculated average is not the approximation average up to now, the currently calculated average may be selected as the approximation average up to now. Here, the case in which the calculated average is not the approximation average up to now includes the case in which the calculated average has a value different from the approximation average up to now.

Here, the behavior combination generation unit 130 may be implemented by a means for generating a candidate group of the behavior combinations or a configuration unit performing a function corresponding to the means so as to select the combinations most approximating the predetermined feeling values of a robot from all the corresponding combinations of the feeling expression behaviors when all the probability values of feelings that are previously calculated by the apparatus for selecting predetermined feeling expression behaviors are entered as an input. In addition, the behavior combination selection unit 150 selects the combinations of the feeling expression behaviors most approximating the probability values of the input feelings based on an optimization algorithm for all the behavior combinations that are generated by the behavior combination generation unit 130. To this end, the behavior combination selection unit 150 generates the feeling values of the combinations of each feeling expression behavior based on the probability table that is previously generated by the feeling expression setting unit 110. Further, the behavior combination selection unit 150 selects the combinations of the feeling expression behaviors having the most approximation feeling values by comparing the input with the feeling values of the combinations of each feeling expression behavior to express the feelings of a robot.

Describing in more detail, the behavior combination selection unit 150 does not have an interest in the corresponding behavior combinations when the currently calculated average is not the approximation average up to now. The reason is that there is no need to select the current behavior combinations when there are the behavior combinations more approximating the feeling values. Therefore, when the currently calculated average is not the approximation average, the currently calculated average may be discarded as being considered as dummy.

However, when intending to select various behavior combinations for the same feelings, it is possible to additionally give an opportunity of being selected as the approximation average to the currently calculated average, rather than the approximation average up to now.

To this end, the behavior combination selection unit 150 determines whether the difference between the currently calculated average and the approximation average satisfies the randomness. In this case, the randomness signifies that a randomly selected constant is a reference.

That is, various schemes determining whether the difference between the currently calculated average and the approximation average satisfies the randomness based on the randomly selected constant a reference may be provided.

The difference between the currently calculated average and the approximation average may include an indirect subtraction in addition to a direct subtraction. The example may determine whether the randomness is satisfied as the following Equation 3.

$$P_A(k) > \text{random}(0,1) \quad \text{[Equation 3]}$$

In the above Equation 3, $$P_A(k) = e^{\frac{1}{Z}(\text{error}(b_{est}(k)) - \text{error}(b_{can}(k)))},$$

and
random (0, 1) is a random value between 0 and 1,
Z is a value reduced whenever a repeated value is counted as an ending constant,
error ($b_{best}(k)$) is a size of a difference between the optimal behavior combinations and the feeling values of a robot, and
error ($b_{can}(k)$) is as a size of a difference between the behavior combinations and the feeling values of a robot, $$\text{error}(b_{can}(k)) = \left\| e(k) - \frac{1}{P}\sum_{p=1}^{P} \overline{e}_p, w_p \right\|.$$

In the above Equation 3, a difference between the calculated average and the approximation average is represented by $P_A(k)$ and a value between 0 and 1 is used as a random constant.

The ending constant Z will be described below as one associated with the repeated value, that is, the repeated frequency.

Figure 8:
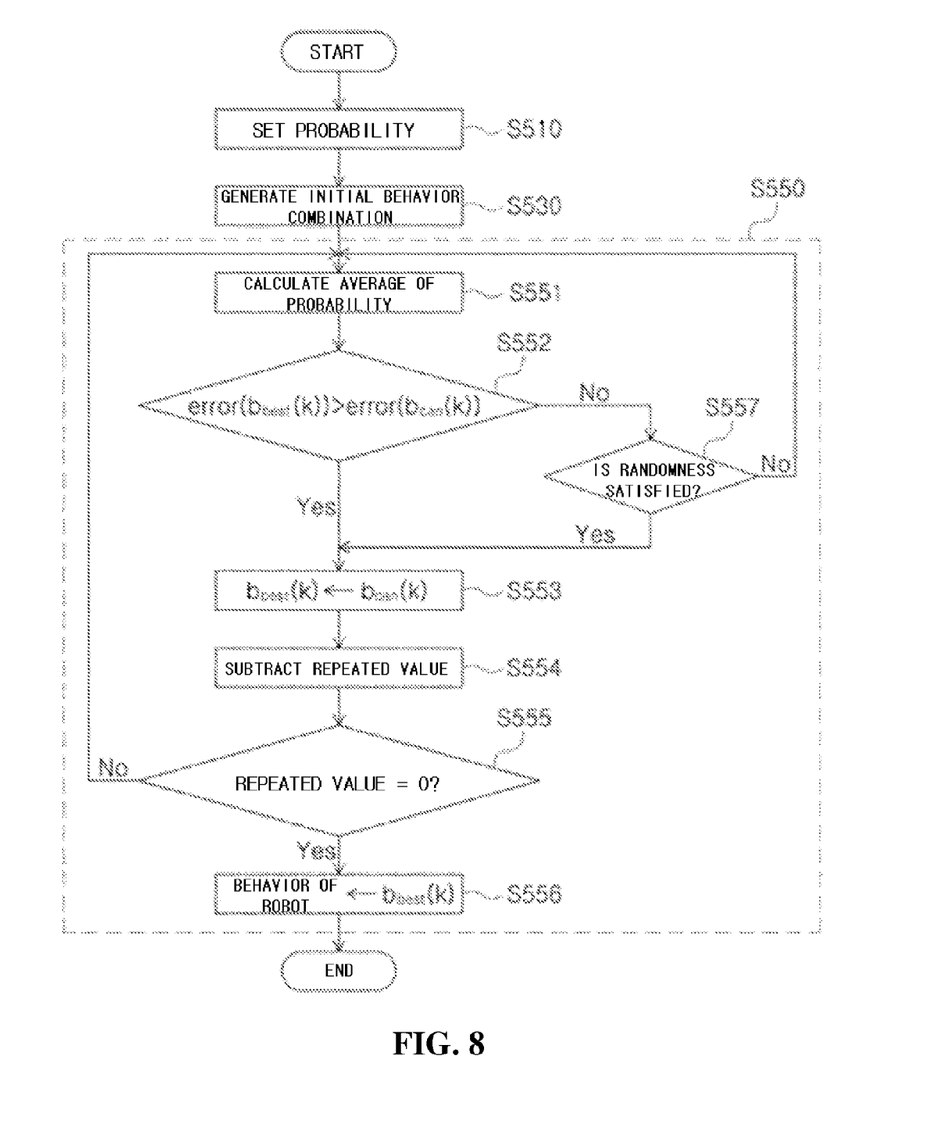
FIG. 8 is a flow chart illustrating a method for selecting feeling expression behaviors in accordance with an embodiment of the present invention.

FIG. 8 is a block diagram illustrating a method for selecting feeling expression behaviors in accordance with an embodiment of the present invention.

The method for selecting feeling expression behaviors illustrated in FIG. 8 may correspond to a description of an operation of the apparatus for selecting feeling expression behaviors illustrated in FIG. 4.

First, a probability of each feeling expression behavior performed for each expression element of a robot for each predetermined feeling is set (S510). Each feeling as the behavior performed by the feeling expression setting unit 110 is previously set by a user.

At least one behavior combination is generated by randomly extracting the feeling expression behaviors from each expression element one by one (S530). This is a behavior that is performed by the behavior combination generation unit 130.

The average of the probabilities of the feeling expression behaviors included in the behavior combinations is calculated for each feeling and the behavior combinations in which the average most approximate the feeling value of a robot is selected from the behavior combinations (S550). The behavior performed by the behavior combination selection unit 150 may be selected as the behavior combinations according to Equation 2 by way of example.

Here, a step of selecting the behavior combinations will be described below in detail.

a) The probability of each feeling expression behavior performed for each expression element of a robot for each predetermined feeling is set (S510). The priority may be transformed into the probability as the above Equation 1 in consideration of convenience of user.

b) The initial behavior combination is generated by extracting the feeling expression behaviors most approximating the feeling values of a robot for each expression element (S530).

The initial behavior combination $b_{init}$ may be defined by the following Equation 4.

$$b_{init} = [w_1\ w_2 \ldots w_p \ldots w_P]^T \in R^P \quad \text{[Equation 4]}$$

In the above Equation 4, $$w_p = \underset{w_p}{\text{argmin}} \left\| e(k) - \overline{e}_{p,w_p} \right\|$$

and $R^P$ a P-dimensional vector that uses a real number as a component. That is, the $b_{init}$ is represented by the P-dimensional vector and uses a real number as a component.

c) The behavior combinations are generated by randomly extracting the feeling expression behaviors from each expression element one by one and the average of the probabilities of the feeling expression behaviors included in the behavior combinations is calculated for each feeling (S551).

The generated behavior combination $b_{can}(k)$ may be defined by the following Equation 5.

$$b_{can}(k) = [w_1\ w_2 \ldots w_p \ldots w_P]^T \in R^P \quad \text{[Equation 5]}$$

In the above Equation 5, the $b_{can}(k)$ is a combination of the randomly extracted feeling expression behaviors and therefore, there is no clue like $$w_p = \underset{w_p}{\operatorname{argmin}} \|e(k) - \overline{e}_{p,w_p}\|$$

according to Equation 4.

d) It is determined which of the average of the probabilities and the optimal behavior combination $b_{best}(k)$ using the initial behavior combination as an initial value more approximates the feeling values of a robot (S552).

In this case, the Equation used for determination may be defined by the following Equation 6.

$$b_{can}(k) = [w_1 \, w_2 \ldots w_p \ldots w_P]^T \in R^P \quad \text{[Equation 6]}$$

In the above Equation 6, $$\operatorname{error}(b_{can}(k)) = \left\| e(k) - \frac{1}{P}\sum_{p=1}^{P} \overline{e}_p, w_p \right\|,$$

at the initial of the determination, $\operatorname{error}(b_{best}(k)) = \|e(k) - b_{init}\|$, and in step e), when substitution is performed, $\operatorname{error}(b_{best}(k)) = \operatorname{error}(b_{can}(k))$.

e) When the average of the probabilities more approximate the feeling values of a robot, that is, satisfies Equation 6, the optimal behavior combination $b_{best}(k)$ is substituted into the behavior combination $b_{can}(k)$ of the average of the probabilities (S553) ($b_{best}(k) \leftarrow b_{can}(k)$) and when the repeated value is subtracted (S554) and then, the repeated value is 0 (S555), the optimal behavior combination is selected as the behavior of a robot (S556) and otherwise, it returns to the step c).

Further, when the repeated value is not necessarily 0 and is a value or less that is set by a user, the optimal behavior combination may be selected as the behavior combination that is expressed by a robot. That is, the repeated value may be set by various schemes, Equations, and constants.

For example, when the ending constant Z and the ending reference $\epsilon$ are set and satisfy the following Equation 7, the repeated value may be processed as 0.

$$Z < \epsilon \quad \text{[Equation 7]}$$

In the above Equation 7, the initial Z is a real number larger than $\epsilon$ and the subtraction of the repeated value substitutes Z into $\xi Z$, wherein $0 < \xi < 1$.

The ending constant Z of Equation 3 may be the ending constant of Equation 7. In this case, as the repeated frequency is increased, the probability that the currently calculated average satisfies the above Equation 3 is increased.

f) When the optimal behavior combination more approximates the feeling value of a robot, it is determined whether the difference between the behavior combination of the average of the probabilities and the optimal behavior combination satisfies the randomness (S557). For example, the randomness may be determined according to Equation 3.

Further, even in this case, only when the optimal behavior combination more approximates the feeling value of a robot, there is no need to review whether to satisfy the randomness. Even though the optimal behavior combination does not more approximate the feeling value of a robot, it can review whether to satisfy the randomness.

g) When satisfying the randomness, the optimal behavior combination is substituted into the behavior combination (S553) and when the repeated value is subtracted (S554) and then, the repeated value is 0 (S555), the optimal behavior combination is selected as the behavior of a robot (S556) and when the repeated value is not 0, it returns to the step c).

In this case, similarly to the above description, the repeated value is not necessarily 0 and when the value set by a user is 0 or less, the optimal behavior combination may be selected as the behavior of a robot.

h) When not satisfying the randomness (S557), it returns to the step c) without the subtraction of the repeated value. Further, even though the randomness is not satisfied, the repeated value is subtracted and then, it may return to the step c). Whether to satisfy the randomness of the steps g) and h) may be performed according to the above Equation 3. Even though returning to the step c) without the subtraction of the repeated value is the case in which the step e) is never performed according to the determination result of Equation 6, it signifies that the step g) is necessarily performed. Therefore, when the step g) is not necessarily performed, the repeated value is subtracted in the step h) and it returns to the step c).

Meanwhile, even though peoples generally feel the same feeling, the same feeling is expressed. Further, even when the same person feels the same feeling, the feeling cannot be similarly expressed. In consideration of these aspects, the present invention can perform more delicate feeling expression based on whether the randomness is reviewed.

That is, the present invention may select the behavior combination so as to express the feeling based on the randomness review even though the currently input feeling value and the behavior combination are not the most similar combination. Through this, even though a similar feeling value is input like an actual person, the robot may differently express the feeling value. To this end, a step of stochastically adding the behavior combination according to the randomness review results may be further included.

In other words, when the step of reviewing whether to satisfy the randomness is not included, the present invention generates and outputs the behavior combination that expresses the optimal feeling most similar to the current feeling value, while when the step of reviewing whether the randomness is satisfied is included, another expression behavior combination can be generated and output in some cases even though a similar feeling value similarly to the actual human is input. In addition, the different expression behavior combinations belong to similar categories.

According to the apparatus and method for selecting feeling expression behaviors of the present invention, the combinations most approximating the current feeling value are selected from the combinations of various feeling expression behaviors, such that the feeling expression scheme of more natural feeling may be given to the robot performing the feeling expression behaviors including the selected combinations The present invention can be applied to the robot that can express the feeling.

In particular, it is advantageous that the present invention can be applied to the robot having the feeling expression elements having a structure similar to organism.

As set forth above, the apparatus and method for selecting feeling expression behaviors in accordance with the embodiment of the present invention can select behavior combinations most approximating the current feeling value from combinations of various feeling expression behaviors in real time, thereby allocating the feeling expressions of more natural feeling to the robot performing the feeling expression behaviors included in the selected behavior combinations.

In other words, in accordance with the existing feeling expression method for setting the combination of the feeling expression behaviors to the limited number of points on the vector space, for example, all the feeling expression behaviors set to the point 1 are similarly performed for a plurality of feeling values in the vicinity of the point 1, but in accordance with the embodiment of the present invention, different feeling expression behaviors can be performed according to each feeling value. Therefore, it is possible to implement various feeling expressions more similar to the human's feeling expressions. Further, it is possible to implement more natural feeling expressions by selecting the combination of the feeling expression behaviors reflecting the randomness.

Meanwhile, it can be understood to a person with skilled in the art to which the present invention pertains that the present invention can be practiced in other detailed forms without changing the technical ideas or essential features of the present invention. Therefore, the foregoing embodiments are only by way of example and therefore, it is to be understood that the present invention is not limited to the foregoing embodiments. The scope of the present invention is defined by claims to be described rather than by the detailed description and it is to be construed that all the changes or modified forms derived from the meanings, scope, and equivalent concept of claims are included in the scope of the present invention.

What is claimed is:

1. An apparatus for selecting a motion expressing artificial feelings, the apparatus comprising:
   a feeling expression setting unit configured to set a probability of each of feeling expression behaviors performed by each of expression elements of a machine with respect to each of predetermined feelings;
   a behavior combination generation unit configured to generate at least one behavior combination comprising at least one of the feeling expression behaviors randomly extracted from each of the expression elements one at a time, wherein the probability of each of the feeling expression behaviors includes at least one of probabilities of at least one of the predetermined feelings; and
   a behavior combination selection unit configured to:
      calculate each of averages of the probability of the feeling expression behaviors included in the at least one behavior combination according to each of the predetermined feelings of the machine; and
      select one of the at least one behavior combination having an approximate average, wherein the approximate average is any of the averages of the probability of each of the feeling expression behaviors according to each of the predetermined feelings closest to a predetermined feeling value of the machine.

2. The apparatus of claim 1, wherein the behavior combination selection unit is configured to:
   calculate each of the averages of the probability of the feeling expression behaviors in an order of the at least one behavior combination input from the behavior combination generation unit, and
   select any of the averages of the probability of the feeling expression behaviors as the approximate average, when any of the averages of the probability of the feeling expression behaviors is not same with the approximate average, and a difference between the any of the averages of the probabiilty of the feeling expression and the approximate average satisfies a randomness.

3. A method for selecting a motion expressing artificial feelings, the method comprising:
   setting a probability of each of feeling expression behaviors performed by each of expression elements of a machine with respect to each of predetermined feelings;
   generating at least one behavior combination comprising at least one of the feeling expression behaviors randomly extracted from each of the expression elements one at a time, wherein the probability of each of the feeling expression behaviors includes at least one of probabilities of at least one of the predetermined feelings;
   calculating each of averages of the probability of the feeling expression behaviors included in the at least one behavior combination according to each of the predetermined feelings of the machine; and
   selecting one of the at least one behavior combination having an approximate average, wherein the approximate average is any of the averages of the probability of each of the feeling expression behaviors according to each of the predetermined feelings closest to a predetermined feeling value of the machine.

4. The method of claim 3, wherein one of the at least one behavior combination having an approximate average b(k) is determined according to the following Equation:

$$b(k) = \arg\min_{[w_1 w_2 \ldots w_P w_P]^T} \left\| e(k) - \frac{1}{P}\sum_{p=1}^{P} \overline{e}_{p,w_p} \right\|,$$

wherein the e(k) denotes a feeling value (vector) of the machine to express at a given k time, P denotes a total number of the expression elements of the machine, $\overline{e}_{p,w_p}$ denotes a feeling value (vector) of a $w_p$-th feeling expression behavior of a p-th expression element, ∥ ∥ denotes a vector size (inter-vector distance), min denotes an operator that selects a minimum value of a plurality of given values, $\arg_{[w_1 w_2 \ldots w_p \ldots w_P]^T}$ denotes an operator that indicates provides factors $w_1, w_2, \ldots, w_p, \ldots, w_P$ used for calculation in a transposed matrix, and b(k) denotes the behavior combination selected as one closest to the feeling value of the machine.

5. A method for selecting a motion expressing artificial feelings, the method comprising:
   a) setting a probability of each of feeling expression behaviors performed by each of expression elements of a machine with respect to each of predetermined feelings;
   b) generating an initial behavior combination by extracting the feeling expression behaviors closest to predetermined feeling values of the machine with respect to each of the expression elements;
   c) generating behavior combinations by randomly extracting the feeling expression behaviors from each of the expression elements one at a time, wherein the probability of each of the feeling expression behaviors includes at least one of probabilities of at least one of the predetermined feelings, and calculating each of averages of the probability of the feeling expression behaviors included in the behavior combinations according to each of the predetermined feelings of the machine;
   d) determining which of each of the averages of the probability of the feeling expression behaviors and an optimal behavior combination using the initial behavior combination as an initial value is closer to the predetermined feeling values of the machine; and
   e) when any of the averages of the probability of the feeling expression behaviors is closer than the optimal behavior combination to the predetermined feeling values of the machine, substituting the behavior combinations having one of the averages of the probability of the feeling expression behaviors closer than the optimal behavior combination to the predetermined feeling values of the machine for the optimal behavior combination, and subtracting a repeated value and when the repeated value is smaller than a predetermined value, selecting the optimal behavior combination as the motion of the machine and otherwise, returning to the step c).

6. The method of claim 5, further comprising:
f) determining whether a difference between the behavior combinations having one of the averages of the probability of the feeling expression behaviors closer than the optimal behavior combination to the predetermined feeling values of the machine and the optimal behavior combination satisfies a randomness;
g) when the randomness is satisfied, substituting the optimal behavior combination with the behavior combinations having one of the averages of the probability of the feeling expression behaviors closer than the optimal behavior combination to the predetermined feeling values of the machine, and subtracting the repeated value, and when the repeated value is smaller than the predetermined value, selecting the optimal behavior combination as the motion of the machine and otherwise, returning to the step c); and
h) when the randomness is not satisfied, returning to the step c).

7. The method of claim 6, wherein the step f) further comprises, when the optimal behavior combination is closer than each of the averages of the probability of the feeling expression behaviors to the predetermined feeling values of the machine, determining whether the difference between the behavior combinations of the averages of the probability of the feeling expression behaviors and the optimal behavior combination satisfies the randomness.

8. The method of claim 6, determining whether the randomness is satisfied is determined according to the following Equation:

$$P_A(k) > \text{random}(0,1),$$

wherein:

$$P_A(k) = e^{\frac{1}{Z}(\text{error}(b_{best}(k)) - \text{error}(b_{can}(k)))};$$

random (0, 1) denotes a random value between 0 and 1;
Z denotes an ending constant having a value reduced whenever the repeated value is counted;
error ($b_{best}(k)$) denotes a size of a difference between the optimal behavior combination and the predetermined feeling values of the machine; and
error ($b_{can}(k)$) denotes a size of a difference between the behavior combinations and the predetermined feeling values of the machine and is defined by the following equation, $$\text{error}(b_{can}(k)) = \left\| e(k) - \frac{1}{P}\sum_{p=1}^{P} \bar{e}_{p,w_p} \right\|,$$

and
wherein:
e(k) denotes a feeling value (vector) of the machine to express at a given k time;
P denotes a total number of the expression elements of the machine;
$\bar{e}_{p,w_p}$ denotes a feeling value (vector) of a $w_p$-th feeling expression behavior of a p-th expression element; and
$\| \; \|$ denotes a size of a vector (inter-vector distance).

* * * * *